US010000877B2

(12) United States Patent
Davis et al.

(10) Patent No.: US 10,000,877 B2
(45) Date of Patent: Jun. 19, 2018

(54) WASHING MACHINE APPLIANCE OUT-OF-BALANCE DETECTION

(71) Applicant: General Electric Company, Schenectady, NY (US)

(72) Inventors: Paul Owen Davis, Prospect, KY (US); David Scott Dunn, Smithfield, KY (US); Gregory Dedow, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 106 days.

(21) Appl. No.: 15/099,745

(22) Filed: Apr. 15, 2016

(65) Prior Publication Data
US 2017/0298556 A1    Oct. 19, 2017

(51) Int. Cl.
*D06F 35/00* (2006.01)
*D06F 37/12* (2006.01)
*D06F 37/20* (2006.01)
*D06F 39/08* (2006.01)
*G01M 1/16* (2006.01)

(52) U.S. Cl.
CPC .......... *D06F 37/203* (2013.01); *D06F 35/005* (2013.01); *D06F 37/12* (2013.01); *D06F 39/088* (2013.01); *G01M 1/16* (2013.01)

(58) Field of Classification Search
CPC ...... D06F 35/005; D06F 37/12; D06F 37/203; D06F 39/088; G01M 1/16
USPC ............... 8/158, 159; 68/12.02, 12.06, 12.27
See application file for complete search history.

(56) References Cited

U.S. PATENT DOCUMENTS

| 5,926,887 | A | * | 7/1999 | Thompson | ............... D06F 37/40 192/12 BA |
| 6,087,951 | A | | 7/2000 | Ramsden et al. | |
| 7,409,738 | B2 | | 8/2008 | Borras et al. | |
| 2006/0130242 | A1 | * | 6/2006 | Hoppe | .................... D06F 33/02 8/158 |
| 2007/0050919 | A1 | * | 3/2007 | Koo | ...................... D06F 35/007 8/158 |
| 2013/0233027 | A1 | | 9/2013 | Carrer et al. | |
| 2014/0069195 | A1 | | 3/2014 | Ledbetter | |

(Continued)

FOREIGN PATENT DOCUMENTS

| EP | 2597187 A1 | 5/2013 |
| WO | WO2011018365 A1 | 2/2011 |

*Primary Examiner* — Levon J Shahinian
(74) *Attorney, Agent, or Firm* — Dority & Manning, P.A.

(57) ABSTRACT

A method for operating a washing machine appliance includes flowing a volume of liquid into a tub, and agitating articles within the tub for a first period and using a first agitation profile, the tub containing the volume of liquid. The method further includes measuring movement of the tub during agitation of the articles within the tub, wherein the step of measuring movement occurs after agitating articles within the tub for the first period and for an intermediate measurement period and using an intermediate agitation profile, and wherein the intermediate agitation profile is different from the first agitation profile. The method further includes agitating articles within the tub for a second period when the final measured movement is greater than an out-of-balance movement threshold. The method further includes draining liquid from the tub when the final measured movement is less than the out-of-balance movement threshold.

20 Claims, 5 Drawing Sheets

(56) References Cited

U.S. PATENT DOCUMENTS

2014/0090181 A1\* 4/2014 Janke .................. D06F 33/02
8/137
2015/0191859 A1 7/2015 Webster et al.

\* cited by examiner

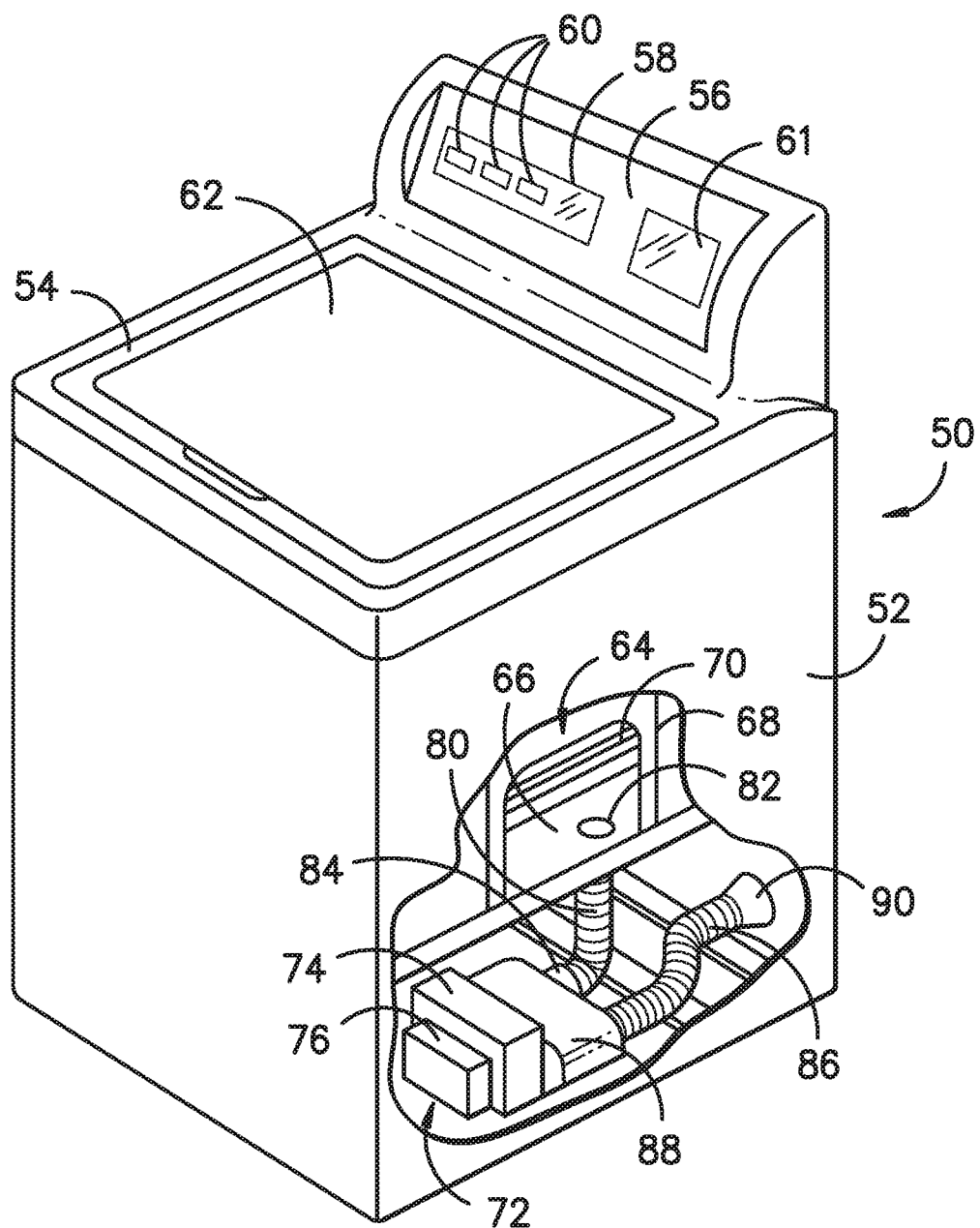
FIG. -1-

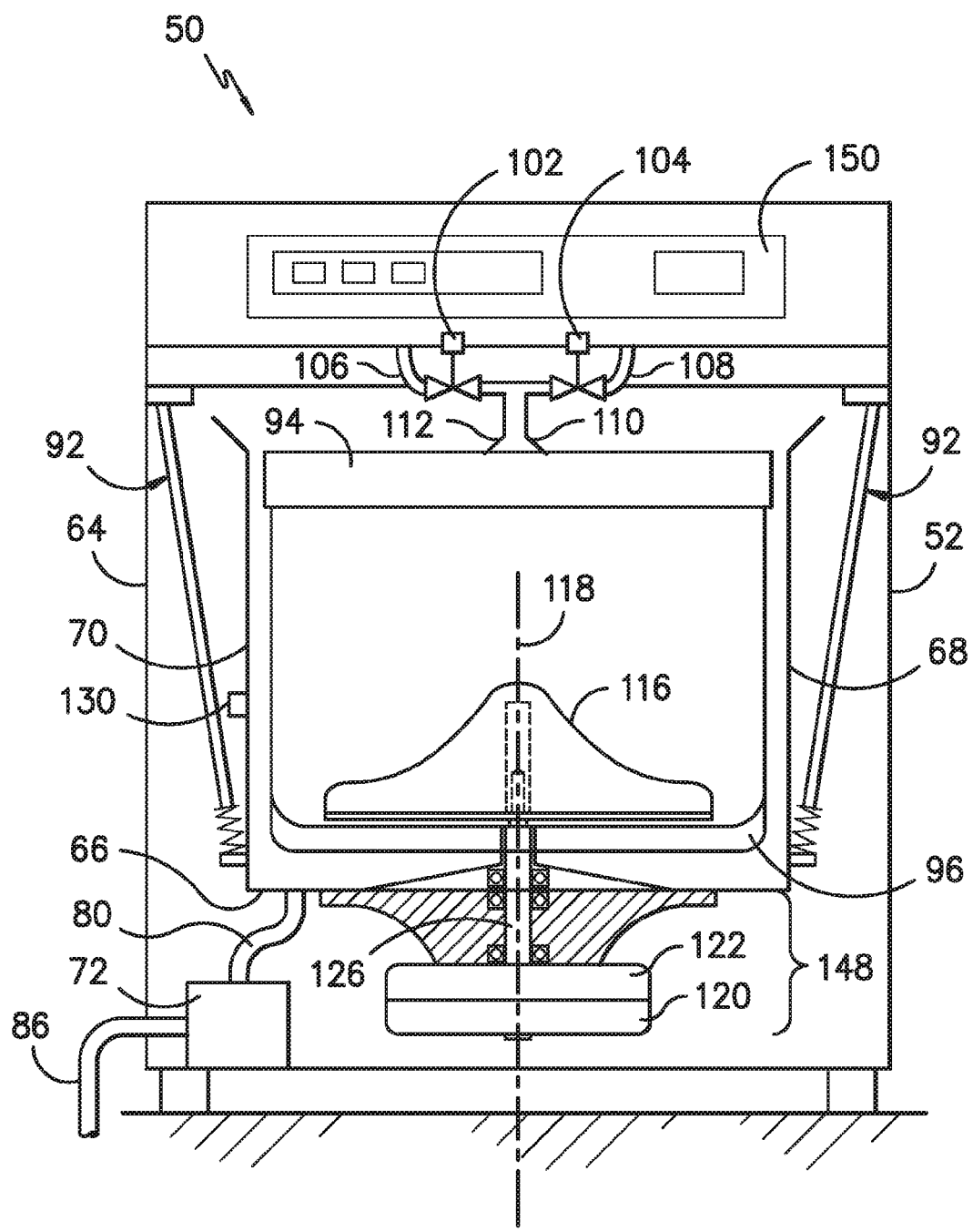
FIG. -2-

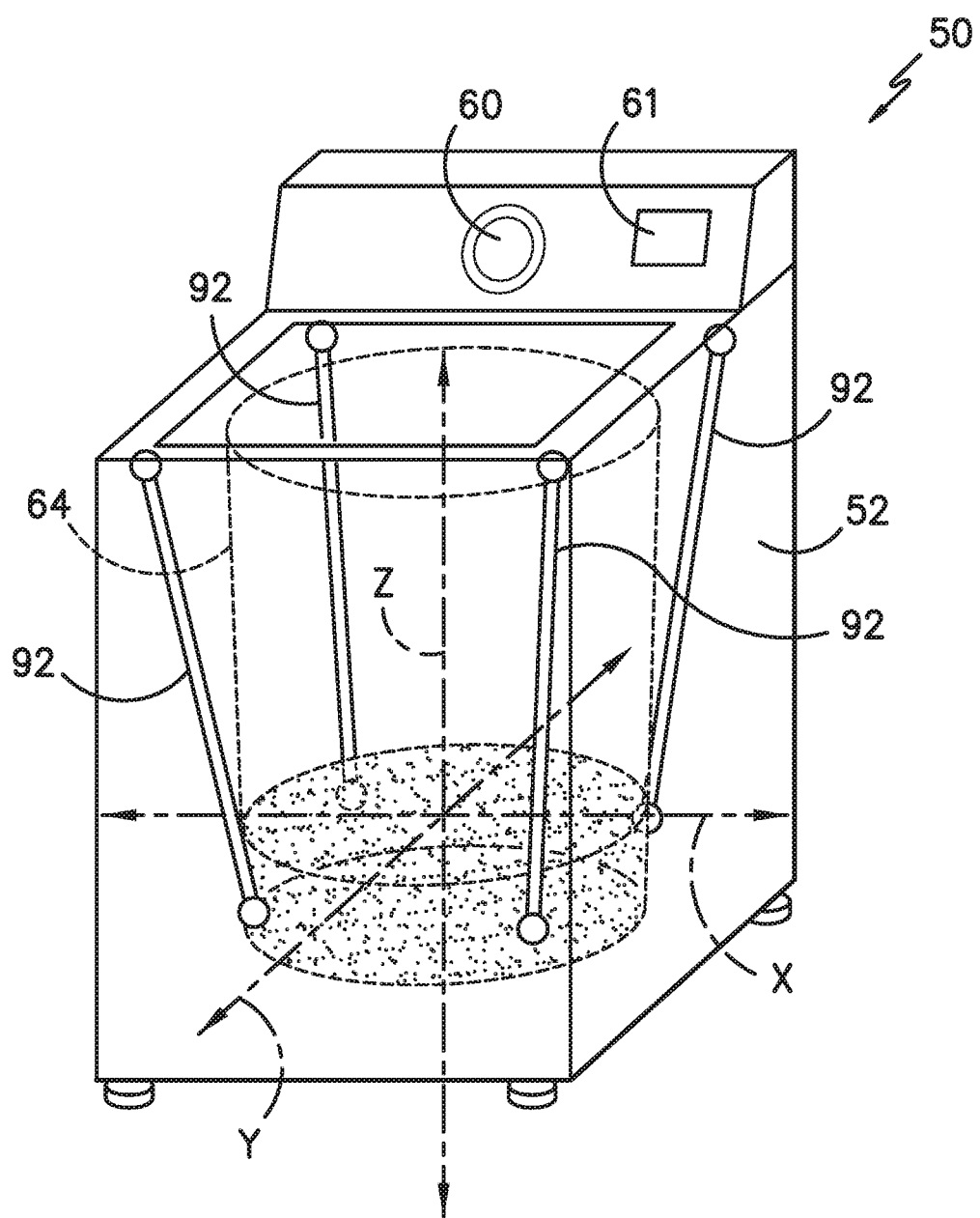
FIG. -3-

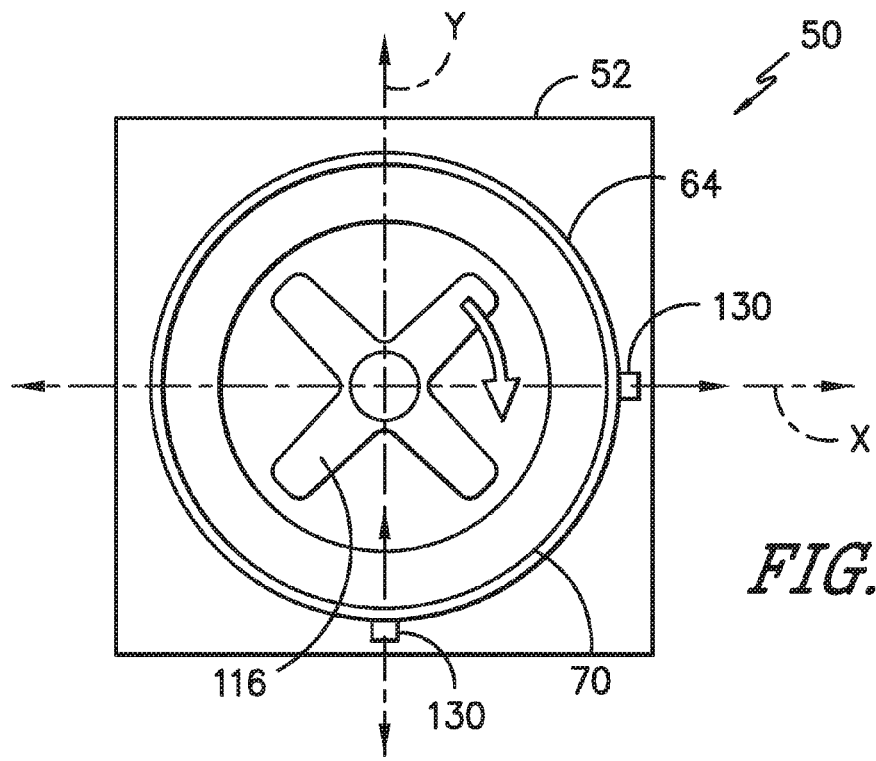
FIG. -4-
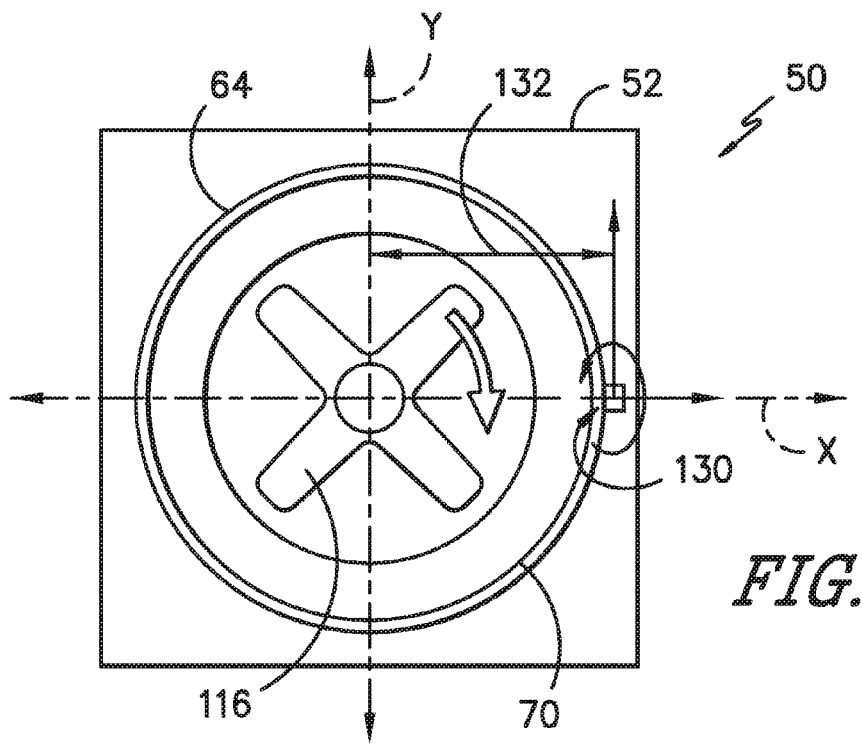
FIG. -5-

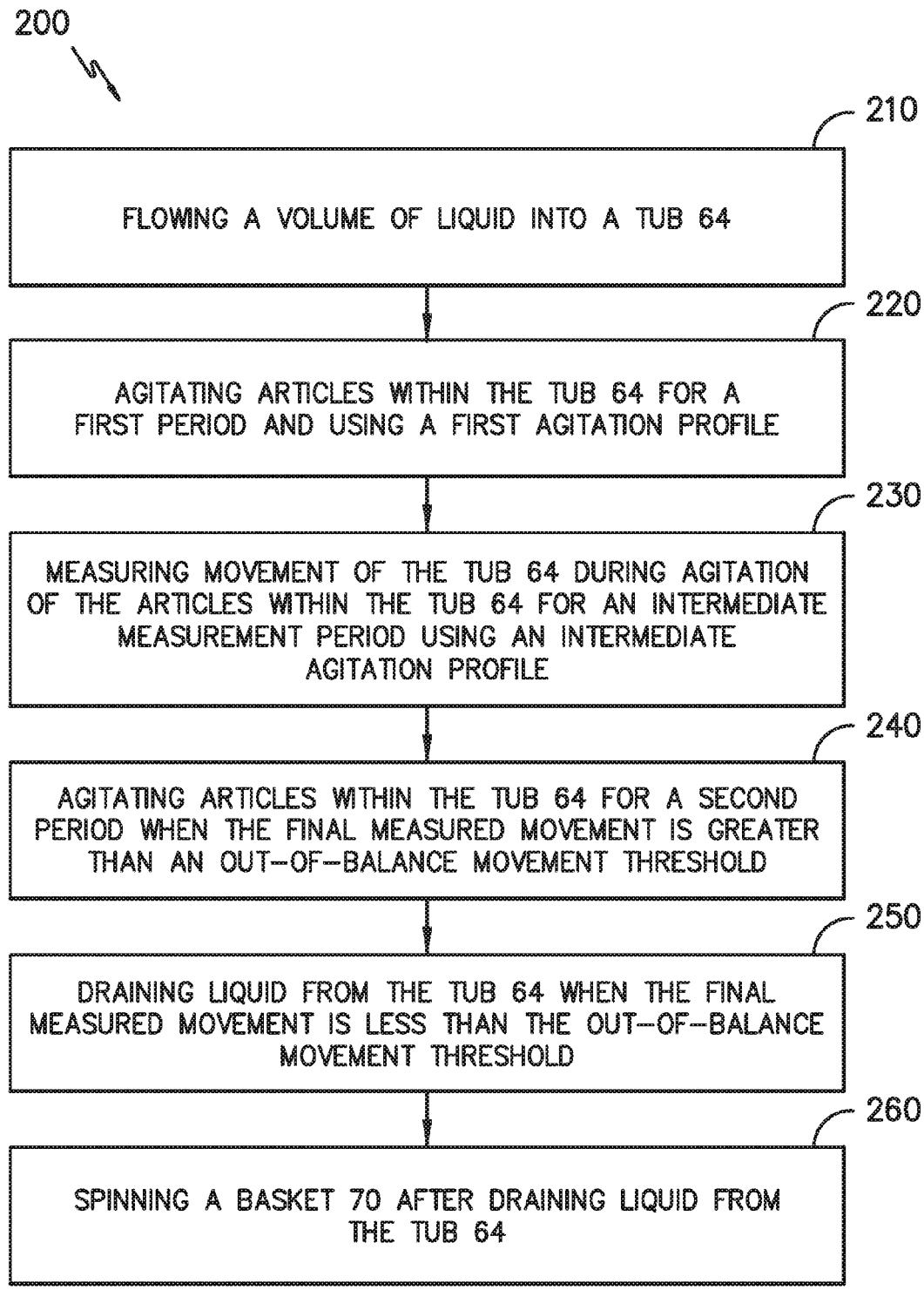
FIG. -6-

WASHING MACHINE APPLIANCE OUT-OF-BALANCE DETECTION

FIELD OF THE INVENTION

The present subject matter relates generally to washing machine appliances, such as vertical axis washing machine appliances, and methods for monitoring load balance states in such washing machine appliances.

BACKGROUND OF THE INVENTION

Washing machine appliances generally include a cabinet which receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with suspension devices. The suspension devices generally allow the tub to move relative to the cabinet during operation of the washing machine appliance.

A significant concern during operation of washing machine appliances is the balance of the tub during operation. This issue is of particular concern for vertical axis washing machine appliances. For example, articles loaded within a basket may not be equally weighted about the central axis of the basket and tub. Accordingly, when the basket rotates, in particular during a spin cycle, the imbalance in clothing weight may cause the basket to be out-of-balance within the tub, such that the central axis of the basket and tub move together in an orbital fashion. Such out-of-balance issues can cause the basket to contact the tub during rotation, and can further cause movement of the tub within the cabinet. Significant movement of the tub can cause the tub to contact the cabinet, potentially causing excessive noise, vibration and/or motion or causing damage to the appliance.

Various methods are known for monitoring load balance of washing machine appliances. However, such methods typically monitor load balance and detect out-of-balance states during the spin cycle, when the basket is spinning at a high rate of speed. Accordingly, noise, vibration, movement or damage may occur despite the out-of-balance detection.

Accordingly, improved methods and apparatus for monitoring load balance in washing machine appliances are desired. In particular, methods and apparatus which provide accurate monitoring and detection at earlier times during the wash cycle would be advantageous.

BRIEF DESCRIPTION OF THE INVENTION

In accordance with one embodiment, a method for operating a washing machine appliance is provided. The washing machine appliance has a tub and a basket rotatably mounted within the tub. The basket defines a chamber for receipt of articles for washing. The method includes flowing a volume of liquid into the tub, and agitating articles within the tub for a first period and using a first agitation profile, the tub containing the volume of liquid. The method further includes measuring movement of the tub during agitation of the articles within the tub, wherein the step of measuring movement occurs after agitating articles within the tub for the first period and for an intermediate measurement period using an intermediate agitation profile, and wherein the intermediate agitation profile is different from the first agitation profile. The method further includes agitating articles within the tub for a second period when the final measured movement is greater than an out-of-balance movement threshold. The method further includes draining liquid from the tub when the final measured movement is less than the out-of-balance movement threshold, and spinning the basket after draining liquid from the tub.

In accordance with another embodiment, a washing machine appliance is provided. The washing machine appliance includes a tub, a basket rotatably mounted within the tub, the basket defining a wash chamber for receipt of articles for washing, a valve, a nozzle configured for flowing liquid from the valve into the tub, an agitation element, a measurement device, and a motor in mechanical communication with the basket, the motor configured for selectively rotating the basket within the tub and further configured for selectively rotating the agitation element. The washing machine appliance further includes a controller in operative communication with the valve, the motor and the measurement device. The controller is configured for flowing a volume of liquid into the tub, and agitating articles within the tub for a first period and using a first agitation profile, the tub containing the volume of liquid. The controller is further configured for measuring movement of the tub during agitation of the articles within the tub, wherein the step of measuring movement occurs after agitating articles within the tub for the first period and for an intermediate measurement period using an intermediate agitation profile, and wherein the intermediate agitation profile is different from the first agitation profile. The controller is further configured for agitating articles within the tub for a second period when the final measured movement is greater than an out-of-balance movement threshold. The controller is further configured for draining liquid from the tub when the final measured movement is less than the out-of-balance movement threshold, and spinning the basket after draining liquid from the tub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance, with a portion of a cabinet of the washing machine appliance shown broken away in order to reveal certain interior components of the washing machine appliance, in accordance with embodiments of the present disclosure;

FIG. 2 provides a front elevation schematic view of various components of the washing machine appliance of FIG. 1.

FIG. 3 is a perspective schematic view of components of a washing machine appliance, with a volume of liquid disposed within a tub of the washing machine appliance, in accordance with embodiments of the present disclosure;

FIG. 4 is a top view of an agitation element, basket, and tub within a cabinet of a washing machine appliance in accordance with embodiments of the present disclosure;

FIG. 5 is a top view of an agitation element, basket, and tub within a cabinet of a washing machine appliance in accordance with embodiments of the present disclosure; and FIG. 6 is a flow chart illustrating a method for operating a washing machine appliance in accordance with embodiments of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view partially broken away of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming an enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

FIG. 2 provides a front elevation schematic view of certain components washing machine appliance 50 including wash basket 70 movably disposed and rotatably mounted in wash tub 64 in a spaced apart relationship from tub side wall 68 and tub bottom 66. Basket 70 includes a plurality of perforations therein to facilitate fluid communication between an interior of basket 70 and wash tub 64.

A hot liquid valve 102 and a cold liquid valve 104 deliver liquid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and liquid is dispersed from inlet tube 110 through a nozzle assembly 112 having a number of openings therein to direct washing liquid into basket 70 at a given trajectory and velocity. A dispenser (not shown in FIG. 2), may also be provided to produce a liquid or wash solution by mixing fresh water with a known detergent and/or other additive for cleansing of articles in basket 70.

Referring now to FIGS. 2, 4 and 5, an agitation element 116, such as a vane agitator, impeller, auger, or oscillatory basket mechanism, or some combination thereof is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated, agitation element 116 is oriented to rotate about a vertical axis 118.

Basket 70 and agitation element 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a motor assembly 148.

Basket 70, tub 64, and machine drive system 148 are supported by a vibration dampening suspension system. The dampening suspension system can include one or more suspension assemblies 92 coupled between and to the cabinet 52 and wash tub 64. Typically, four suspension assemblies 92 are utilized, and are spaced apart about the wash tub 64. For example, each suspension assembly 92 may be connected at one end proximate a corner of the cabinet 52 and at an opposite end to the wash tub 64. The washer can include other vibration dampening elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

A dampening suspension system generally operates to dampen dynamic motion as the wash basket 70 rotates within the tub 64. The dampening suspension system has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system are operating at the first resonant or natural frequency of the dynamic system.

Operation of washing machine appliance 50 is controlled by a controller 150 which is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

Controller 150 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 (such as motor assembly 148 and measurement devices 130 (discussed herein)) may be in communication with controller 150 via one or more signal lines or shared communication busses to provide signals to and/or receive signals from the controller 150.

In an illustrative embodiment, laundry items are loaded into basket 70, and washing operation is initiated through operator manipulation of control input selectors 60 (shown in FIG. 1). Tub 64 is filled with liquid such as water and mixed with detergent to form a wash fluid, and basket 70 is agitated with agitation element 116 for cleansing of laundry items in basket 70. That is, agitation element is moved back and forth in an oscillatory back and forth motion, while basket 70 remains generally stationary (i.e. not actively rotated). In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism. After the agitation phase of the wash cycle is completed, tub 64 is drained with pump assembly 72. Laundry articles can then be rinsed by again adding liquid to tub 64. Depending on the particulars of the cleaning cycle selected by a user, agitation element 116 may again provide agitation within basket 70. After a rinse cycle, tub 64 is again drained, such as through use of pump assembly 72. After liquid is drained from tub 64, one or more spin cycles may be performed. In particular, a spin cycle may be applied after the agitation phase and/or after the rinse phase in order to wring excess wash fluid from the articles being washed. During a spin cycle, basket 70 is rotated at relatively high speeds, such as between approximately 450 and approximately 1300 revolutions per minute.

While described in the context of specific embodiments of washing machine appliance 50, using the teachings disclosed herein it will be understood that washing machine appliance 50 is provided by way of example only. Other washing machine appliances having different configurations (such as vertical-axis washing machine appliances with different suspension assemblies 92), different appearances, and/or different features may also be utilized with the present subject matter as well.

Referring now to FIGS. 4 and 5, one or more measurement devices 130 may be provided in the washing machine appliance 50 for measuring movement of the tub 64, in particular during agitation of articles in the agitation phase of the wash cycle. Measurement devices 130 may measure a variety of suitable variables which can be correlated to movement of the tub 64. The movement measured by such devices 130 can be utilized to monitor the load balance state of the tub 64, in particular during agitation of articles in the agitation phase, and to facilitate agitation in particular manners and/or for particular time periods to adjust the load balance state, i.e. to attempt to balance articles within the basket 70.

For example, in some embodiments, a measurement device 130 may be or include an accelerometer which measures translational motion, such as acceleration along one or more directions. Additionally or alternatively, a measurement device 130 may be or include a gyroscope which measures rotational motion, such as rotational velocity about an axis. Additionally or alternatively, a measurement device 130 may be or include an optical sensor, an inductive sensor, a Hall effect sensor, a potentiometer, a load cell, a strain gauge, or any other suitable device 130 capable of measuring, either directly or indirectly, translational and/or rotational movement. A measurement device 130 in accordance with the present disclosure can be mounted to the tub 64 (i.e. bottom wall 66 or a sidewall 68 thereof), the basket 70, or the cabinet 52, as required to sense movement of the tub 64 relative to the cabinet 52. In particular exemplary embodiments, such as when accelerometers and/or gyroscopes are utilized, the accelerometers and/or gyroscopes may be mounted to the tub 64.

In exemplary embodiments as shown, a measurement device 130 may include a gyroscope and/or an accelerometer (which may be a first accelerometer). The measurement device 130 may further include a second accelerometer and/or second gyroscope. The measurement device 130, for example, may be a printed circuit board which includes the gyroscope(s) and accelerometer(s) thereon. The measurement device 130 may be mounted to the tub 64 (i.e. via a suitable mechanical fastener, adhesive, etc.) and may be oriented such that the various sub-components (i.e. the gyroscope(s) and accelerometer(s)) are oriented to measure movement along or about particular directions as discussed herein. Notably, the gyroscope(s) and accelerometer(s) in exemplary embodiments are advantageously mounted to the tub 64 at a single location (i.e. the location of the printed circuit board or other component of the measurement device 130 on which the gyroscope(s) and accelerometer(s) are grouped). Such positioning at a single location advantageously reduces the costs and complexity (i.e. due to additional wiring, etc.) of out-of-balance detection, while still providing relatively accurate out-of-balance detection as discussed herein. Alternatively, however, the gyroscope(s) and accelerometer(s) need not be mounted at a single location. For example, a gyroscope located at one location on tub 64 can measure the rotation of an accelerometer located at a different location on tub 64, because rotation about a given axis is the same everywhere on a solid object such as tub 64.

As illustrated in FIGS. 3 through 5, tub 64 may define an X-axis, a Y-axis and a Z-axis which are mutually orthogonal to each other. The Z-axis may extend along a longitudinal direction, and may thus be coaxial with the vertical axis 118 when the tub 64 and basket 70 are balanced. The Z-axis may additionally be a central axis, defining the center of the tub 64 in planes defined by the X-axis and Y-axis (as illustrated for example in FIGS. 4 and 5). Movement of the tub 64 measured by measurement devices 130 (such as a directional component of such movement) may, in exemplary embodiments, be an indirect measurement measured along a direction perpendicular or approximately perpendicular to a vector that passes through a center of the tub 64. Such movement may, for example, be measured in a plane defined by the X-axis and Y-axis. Movement of the tub 64 along the particular direction may be calculated using the indirect measurement component and other suitable variables, such as an offset distance along the vector from the measurement device 130 to the center of the tub 64. Additionally or alternatively, movement of the tub 64 measured by measurement devices 130 (such as a directional component of such movement) may, in exemplary embodiments, be a direct measurement measured along or approximately along a vector that passes through a center of the tub 64. Such movement may, for example, be measured in a plane defined by the X-axis and Y-axis. Notably, the plane in which movement is being measured may be coincident with or offset from the plane in which movement of the tub 64 is calculated, as discussed herein.

In some embodiments, for example, movement of the tub 64 may be measured both along or approximately along a direction perpendicular to a vector that passes through a center of the tub 64 and along or approximately along a vector that passes through a center of the tub 64. For example, movement may be measured along the X-axis and the Y-axis at locations that are respectively along or approximately along and perpendicular or approximately perpendicular to such vectors, or along the X-axis and the Y-axis at locations that are perpendicular or approximately perpendicular to such vectors, or along the X-axis and Y-axis at locations that are along or approximately along such vectors. Such movement may, for example, be measured in a plane defined by the X-axis and Y-axis.

In some embodiments as illustrated in FIG. 4, different measurement devices 130 including various components as discussed herein may be provided at different locations, such that measurements are taken along various axes (as shown) and/or perpendicular to various axes as discussed herein. Alternatively, in exemplary embodiments as illustrated in FIG. 5, gyroscope(s) and accelerometer(s) are provided at a single location. A gyroscope, such as the first gyroscope, may be positioned to measure movement about an axis (i.e. rotational movement), such as about the Z-axis as illustrated. The second gyroscope may be positioned to measure movement about another, different axis, such as the X-axis or Y-axis. Each accelerometer may be positioned to measurement movement along another axis, such as the X-axis or the Y-axis as shown. For example, the first accelerometer may measure movement along the Y-axis. Further, in exemplary embodiments as shown, the movement measured by the first accelerometer may be measured along a direction that is perpendicular to a vector that passes through the center of the tub 64 from measurement device 130. The second accelerometer may measure movement along an axis other than that about which the gyroscope is measuring and along which the first accelerometer is measuring. For example, the second accelerometer may measure movement along the X-axis. Further, in exemplary embodiments as shown, the movement measured by the second accelerometer may be measured along a vector that passes through the center of the tub 64.

The measured movement of the tub 64 in accordance with exemplary embodiments of the present disclosure, such as those requiring one or more gyroscopes and one or more accelerometers, may advantageously be calculated based on the movement components measured by these components of the measurement device 130. For example, movement of the tub 64 along an axis wherein an accelerometer is measuring a component of movement along a direction that is perpendicular to a vector that passes through the center of the tub 64 may be calculated using the component of movement measured by that accelerometer as well as the movement component measured by the gyroscope. Specifically, in exemplary embodiments movement measured by a gyroscope and accelerometer may together be utilized to calculate motion at an offset distance, which may for example be an offset distance in an X-Y plane from measurement device 130 to a center and/or an offset distance along the Z-axis from measurement device 130 to a center.

In one embodiment, movement of the tub 64 at a center along the Y-axis may be measured based on the movement measured by the first accelerometer, the movement measured by the gyroscope about the Z-axis, and an offset distance 132 between the center and the first accelerometer along the vector axis. The calculation may be represented by a displacement resultant of a cross-product added to a displacement. Specifically, the calculation may be represented by a Y-axis displacement resultant of a cross-product (i.e. rotation about Z times offset 132) added to the Y-axis displacement at sensor 130 with the result of this calculation being the displacement of the center in the direction of the Y-axis.

In another embodiment, movement of the tub 64 at a center along the X-axis may be measured based on the movement measured by the second accelerometer, the movement measured by the gyroscope about the Y-axis, and an offset distance along the Z-axis between the tub movement measurement location (i.e. location of measurement device 130) and the location of the center for which movement is being measured. The calculation may be represented by a X-axis displacement resultant of a cross-product (i.e. rotation about Y times the Z offset) added to a the X-axis displacement i.e. at a measurement device 130, such as at the second accelerometer, with the result of this calculation being the displacement of the center in the direction of the X-axis in an X-Y plane that is offset from the plane of the measurement device by the offset distance.

Accordingly, movement of the tub 64 along one axis (for example, the Y-axis) at a center of the tub 64 may be indirectly measured. Movement along another axis (for example, the X-axis) may similarly be indirectly measured or may be directly measured, such as by the second accelerometer alone. Movement of the tub 64 within a plane (i.e. the X-Y plane) can thus advantageously be measured at a single location via the use of suitable sensors which provide both direct and indirect measurements.

Further, and as discussed, the measurement device 130 need not be in the X-Y plane in which movement (i.e. at the center) is calculated. For example, measurement device 130 may additionally be offset by an offset distance along the Z-axis. In one particular example, a measurement device 130 mounted to or proximate the bottom wall 66 may be utilized to indirectly measure movement of the center C in an X-Y plane at or proximate the top of the tub 64.

Notably, the term approximately as utilized with regard to such movement measurements denotes ranges such as of plus or minus 2 inches and/or plus or minus 10 degrees relative to various axes passing through the basket center which minimizes the contribution to the measurement result of rotation about the Z-axis as might be caused for example by a torque reaction to motor 120.

Referring now to FIGS. 3 through 6, various methods may be provided for use with washing machine appliances 50 in accordance with the present disclosure. In general, the various steps of methods as disclosed herein may in exemplary embodiments be performed by the controller 150, which may receive inputs and transmit outputs from various other components of the appliance 50. In particular, the present disclosure is further directed to methods, as indicated by reference number 200, for operating washing machine appliances 50. Such methods advantageously facilitate monitoring of load balance states, detection of out-of-balance conditions, and reduction of out-of-balance conditions when detected. Advantageously, such balancing is performed during the agitation phase, before draining and subsequent rinse cycles, spin cycles, etc.

A method 200 may, for example, include the step 210 of flowing a volume of liquid into the tub 64. The liquid may include water, and may further include one or more additives as discussed above. The water may be flowed through hoses 106, 108, tube 110 and nozzle assembly 112 into the tub 64 and onto articles which are disposed in the basket 70 for washing. The volume of liquid is dependent upon the size of the load of articles and other variables which may, for example, be input by a user interacting with control panel 58 and input selectors 60 thereof.

Method 200 may further include, for example, the step 220 of agitating articles within the tub 64 (i.e. disposed within the basket 70) for a first period and using a first agitation profile. Agitating may be performed by agitation element 116 as discussed herein. During such agitation (which is a sub-phase of the agitation phase), the volume of liquid flowed into the tub 64 in step 210 remains in the tub 64 (i.e. no drainage of liquid may occur between steps 210 and 220). The first period is a defined period of time programmed into the controller 150, and the first period and the first agitation profile during the first period may be dependent upon the size of the load of articles and other variables which may, for example, be input by a user interacting with control panel 58 and input selectors 60 thereof. The first agitation profile may generally define the movement of the agitation element 116 to cause agitation of the articles, as discussed in detail herein.

Method 200 may further include, for example, the step 230 of measuring movement of the tub 64 during agitation of the articles within the tub 64. In exemplary embodiments during such measurement, the volume of liquid flowed into the tub 64 in step 210 may remain in the tub 64 (i.e. no drainage of liquid may occur between steps 210 and 230). Alternatively, a portion of the volume of liquid flowed into the tub 64 in step 210 may be drained between steps 220 and 230 to facilitate measurement of tub 64 movement. The portion drained may, for example, be less than or equal to 60% of the volume, such as less than or equal to 50% of the volume, such as less than or equal to 40% of the volume, such as less than or equal to 30% of the volume. Such measurement of movement may occur for a defined period of time programmed into the controller 150. Measurement may be performed by one or more measurement devices 130, as discussed herein.

Such measurement 230 may occur separately and after step 220 (such as directly after with no intervening steps other than a possible pause in agitation and a pause for draining). In these embodiments, such measurement 230 may occur for an intermediate measurement period and using an intermediate agitation profile. The intermediate measurement period is a defined period of time programmed into the controller 150, and the intermediate measurement period and the intermediate agitation profile during the intermediate measurement period may be dependent upon the size of the load of articles and other variables which may, for example, be input by a user interacting with control panel 58 and input selectors 60 thereof. The intermediate agitation profile may generally define the movement of the agitation element 116 to cause agitation of the articles, as discussed in detail herein. Notably, as discussed herein, the intermediate agitation profile may be different from the first agitation profile.

Measurement in accordance with step 230 may result in measured movements of the tub 64 (during the first period or during the intermediate measurement period) being recorded and, for example, transmitted to controller 150. These measurement movements may be utilized to determine if the load of articles, and thus the basket 70 and tub 64, are out-of-balance. Accordingly, an out-of-balance movement threshold may be defined, and may for example be programmed into the controller 150. Measured movement above the threshold may indicate that the present load of articles is out-of-balance, while measured movement below the threshold may indicate sufficient balance of the load of articles.

The out-of-balance movement threshold may include directly or indirectly measured movement components along and/or about one or more directions, such as along the X-axis and/or along the Y-axis, or the instantaneous movement represented by the vector summation of orthogonal components such as X and Y. The usual vector summation is expressed as $(X^2+Y^2)^{(1/2)}$ but any other form of vectorial representation such as $Vector^2=(X^2+Y^2)$ can be used. Measured movement above or below the threshold may be defined as one or more movement components or a vector summation exceeding or not exceeding the component threshold. For example, the value compared to a threshold may be determined by a calculation using any combination of X and or Y that involves their change in value such as a difference between sequential minimum and maximum values derived from a representation of the motion's waveform.

Notably, in some embodiments, methods 200 in accordance with the present disclosure facilitate "preferential stopping" of the agitation phase when, for example the measured movement is below the out-of-balance movement threshold and thus the load is indicated as being sufficiently balanced. Accordingly, in some embodiments during the measuring movement step 230, agitating of the articles may be actively ceased upon determination that the measured movement is less than the out-of-balance movement threshold. Such active ceasing may occur during the first period or during the intermediate period, and may for example occur after a predetermined sub-period of agitation during which agitation occurs regardless of whether the measured movement is above or below the out-of-balance movement. Active ceasing thus actively discontinues the measuring movement step 230 (such as via a signal from the controller 150) before the defined period for measuring movement expires, and allows the wash cycle to continue to subsequent steps that occur after the agitation phase (i.e. draining, rinsing and/or spinning).

Movement of the tub 64 may be measured for a defined period (which may for example be a component of the first period or intermediate measurement period as discussed above). The measured movements may be compared to the out-of-balance movement threshold. When a final measured movement is greater than the out-of-balance threshold, further agitation of the articles may occur in an effort to redistribute the articles to balance the load. For example, method 200 may include the step 240 of agitating articles within the tub 64 (i.e. disposed within the basket 70) for a second period and using an agitation profile, which may be the first agitation profile or a second agitation profile different from the first agitation profile. Agitating may be performed by agitation element 116 as discussed herein.

In some embodiments, during such agitation (which is a sub-phase of the agitation phase), the volume of liquid flowed into the tub 64 in step 210 may remain in the tub 64 (i.e. no drainage of liquid may occur between steps 210 and 240). Alternatively, only the portion of the volume remaining after draining of a portion of the volume of liquid flowed into the tub 64 (such as between steps 210 and 220) in step 210 may remain in the tub 64. In either case, no additional draining, aside from partial draining between steps 210 and 220, may occur between steps 210 and 240. The second period is a defined period of time programmed into the controller 150, and the second period and the rate and pattern of agitation during the second period may be dependent upon the size of the load of articles and other variables which may, for example, be input by a user interacting with control panel 58 and input selectors 60 thereof. Notably, the second period and the second agitation profile during the second period may be particularly defined to facilitate redistribution of articles in an effort to balance the load of articles. The second agitation profile may generally define the movement of the agitation element 116 to cause agitation of the articles, as discussed in detail herein.

When a final measured movement is, on the other hand, less than the out-of-balance threshold (or when agitating is actively ceased as discussed above), the wash cycle may proceed from the agitation phase to other phases of the wash cycle (i.e. draining, rinsing and/or spinning). For example, method 200 may further include the step 250 of draining liquid from the tub 64 (as discussed herein) when the final measured movement is less than the out-of-balance movement threshold (or when agitating is actively ceased as discussed above). Method 200 may further include the step 260 of spinning the basket 70 (as discussed herein) after step 250 of draining liquid from the tub 64. Additional intermediate rinsing and draining steps may additionally be provided, as desired or required for a particular wash cycle.

As discussed, various agitation profiles may be utilized when agitating articles during various periods in the agitation phase of the wash cycle. For example, a first agitation profile may be utilized during the first period, an intermediate agitation profile may be utilized during the intermediate period during which measurement of movement of the tub 64 is occurring. Either the first agitation profile or a second agitation profile (which is different from the first agitation profile) may be utilized during the second period. The intermediate agitation profile is, in exemplary embodiments, different from the first agitation profile. Further, the intermediate agitation profile is, in exemplary embodiments, different from the second agitation profile. The intermediate agitation profile may be individually tailored to cause optimal pulsing during agitation which facilitates accurate measurement of the movement of the tub 64, and thus accurate out-of-balance detection.

Each agitation profile may include a plurality of characteristics which define the agitation profile. For example, each agitation profile may be defined by an acceleration rate, an acceleration duration, a stroke duration, a stroke coast characteristic, a stop characteristic, a dwell time between strokes, and a stroke direction pattern. The acceleration rate is the rate of acceleration of the agitation element 116 caused by operation (i.e. controlling of the electrical current) of the motor 120 to cause rotation of the agitation element 116. The acceleration duration is the length of time that the agitation element 116 is accelerating during a single stroke, and may be calculated based on the length of time that the motor 120 is accelerating. The stroke duration is the time from the beginning of acceleration of the agitation element 116 to when the agitation element 116 stops independently moving during a single stroke. The stroke coast characteristic is a characteristic of the movement of the agitation element, as controller by the motor 120, which minimizes the effect of the agitation element 120 on the associated load of articles from the end of acceleration until the agitator stops during a single stroke. For example, the stroke coast characteristic may be a constant speed at which the motor 120 is driven, a constant motor 120 current, or a controller deceleration of the motor 120 and thus the agitation element 116. The stop characteristic is the action that causes the agitation element 116 to stop independent movement, and may be motor 120 braking, friction pad braking, or zero motor current. The dwell time between strokes is the pause, between agitation pulses during which there is no movement of the agitation element 116. The stroke direction pattern is the pattern of successive strokes of the agitation element 116 (as caused by pulsing of the motor 120); i.e. whether each individual stroke or a plurality of successive strokes occurs in the clockwise or counterclockwise direction.

As discussed, the intermediate agitation profile is different from the first agitation profile and, in exemplary embodiments, different from the second agitation profile. Accordingly, one or more characteristics of the intermediate agitation profile is different from the first agitation profile and, in exemplary embodiments, different from the second agitation profile.

For example, in exemplary embodiments, the maximum acceleration rate for the intermediate agitation profile may be greater than the maximum acceleration rate for the first agitation profile, and in some embodiments may be greater than the maximum acceleration rate for the second agitation profile. In some embodiments, the maximum acceleration for the intermediate agitation profile may, for example, be the maximum acceleration achievable using motor 120.

Additionally or alternatively, the stroke duration between strokes for the intermediate agitation profile may correspond to a natural frequency of the tub 64 relative to the cabinet 52 of the washing machine appliance 50. The pendulum swinging style movement of the tub 64 relative to the cabinet 52 (such as in an X-Y plane and as allowed by suspension assemblies 92) will have a natural frequency, which may be defined as a natural frequency for the X-axis component of movement, a natural frequency for the Y-axis component of movement, or a natural frequency for movement on any vector in the X-Y plane. The natural frequency may, for example, be empirically or theoretically determined, and may be determined for the length of the suspension assemblies 92 (i.e. natural frequency=square root (32.17/length [feet])÷(2π)[Hz]).

In exemplary embodiments, for example, the stroke duration for the intermediate agitation profile may be one-quarter to one-third of a natural frequency of the tub 64 relative to the cabinet 52. In some embodiments, such as wherein the natural frequency is 0.6667 Hertz (corresponding to 40 revolutions per minute), the stroke duration may thus be 0.375 seconds (i.e. one-quarter of 1.5 seconds) to 0.5 seconds.

Additionally or alternatively, the acceleration rate, acceleration duration and stroke duration may be selected so that the total agitation element 116 rotation, i.e. stroke distance for a single stroke is in a range between 60 degrees and 150 degrees.

Additionally or alternatively, the dwell time between strokes for the intermediate agitation profile may be the length of time that when summed with the value of the stroke duration results in successive strokes occurring at a rate of between 38% and 67% of the time period of the first mode natural frequency, such as between 45% and 55% of the time period of the first mode natural frequency, such as 50% (i.e. one half time period) of the first mode natural frequency if the second intermediate stroke is in the direction opposite the first intermediate stroke. When the direction of sequential intermediate strokes are in the same direction it is preferred that the dwell time be selected so that successive strokes occur at a rate of between 75% and 133% of the time period of the first mode natural frequency, such as between 90% and 110% of the time period of the first mode natural frequency, such as 100% (i.e. one time period) of the first mode natural frequency. For example, if the first mode natural frequency is 1.5 seconds, successive strokes are opposite in direction and the stroke duration is 0.4 seconds, the preferred rate of repetition is 0.75 seconds and the dwell is 1.5/2−0.4=0.35 seconds. If the first mode natural frequency is 1.5 seconds, successive strokes are in the same direction and the stroke duration is 0.4 seconds, then the preferred rate of repetition is 1.5 seconds and the dwell is 1.5−0.4=1.1 seconds.

Additionally or alternatively, the stroke direction pattern for the intermediate agitation profile may be different from the stroke direction pattern for the first agitation profile. Further, the stroke direction pattern for the intermediate agitation profile may be different from, such as greater than or less than, the stroke direction pattern for the second agitation profile. For example, the stroke direction pattern for the intermediate agitation profile may include a plurality of successive strokes in a single direction (which may be clockwise as shown or alternatively counterclockwise) with no intervening strokes in an opposite direction (i.e. counterclockwise or alternatively clockwise). In some embodiments, the stroke direction pattern for the intermediate agitation profile may only include strokes in a single direction, with no strokes in the opposite direction. In other embodiments, the stroke direction pattern for the intermediate agitation profile may include a plurality of successive strokes each in an opposite direction of the preceding stroke.

The stroke direction pattern for the first agitation profile (as well as the optional second agitation profile), on the other hand, may optionally include alternating single strokes in opposing directions (i.e. a single counterclockwise stroke followed by a single clockwise stroke and/or a single clockwise stroke followed by a single counterclockwise stroke). Alternatively, other suitable stroke direction patterns for the first agitation profile and/or second agitation profile which are different from the stroke direction pattern for the intermediate agitation profile may be utilized.

The use of different agitation profiles for different portions of the agitation phase of the wash cycle may advantageously facilitate improved washing and improved tub 64 movement measurement and out-of-balance monitoring. As discussed, the intermediate agitation profile may be individually tailored to facilitate improved tub 64 movement measurement. The first agitation profile and the optional second agitation profile may be individually tailored to facilitate movement and turnover of articles within the basket 70 to provide improved tub 64 balancing and improved washing of the articles.

It should be noted that the various steps as disclosed herein may be repeated as desired or required in order to facilitate load balancing during a wash cycle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a washing machine appliance, the washing machine appliance having a tub and a basket rotatably mounted within the tub, the basket defining a chamber for receipt of articles for washing, the method comprising:
   flowing a volume of liquid into the tub;
   agitating articles within the tub for a first period and using a first agitation profile, the tub containing the volume of liquid;
   measuring movement of the tub during agitation of the articles within the tub, wherein the step of measuring movement occurs after agitating articles within the tub for the first period and for an intermediate measurement period using an intermediate agitation profile, and wherein the intermediate agitation profile is different from the first agitation profile;
   agitating articles within the tub for a second period when the final measured movement is greater than an out-of-balance movement threshold;
   draining liquid from the tub when the final measured movement is less than the out-of-balance movement threshold; and
   spinning the basket after draining liquid from the tub, wherein agitating articles within the tub comprises redistributing the articles during a tumbling cycle within the tub through a repeated starting-stopping pattern of agitation strokes according to a corresponding agitation profile prior to the draining liquid from the tub.

2. The method of claim 1, wherein the first agitation profile and the intermediate agitation profile are each defined by an acceleration rate, an acceleration duration, stroke duration, a dwell time between strokes, and a stroke direction pattern.

3. The method of claim 2, wherein a maximum acceleration rate for the intermediate agitation profile is greater than a maximum acceleration rate for the first agitation profile.

4. The method of claim 2, wherein the stroke duration for the intermediate agitation profile is between one-quarter and one-third of a natural frequency of the tub relative to a cabinet of the washing machine appliance.

5. The method of claim 2, wherein a total stroke distance for the intermediate agitation profile is between 60 degrees and 150 degrees.

6. The method of claim 2, wherein the stroke direction pattern for the intermediate agitation profile comprises a plurality of successive strokes in a single direction with no intervening strokes in an opposite direction.

7. The method of claim 6, wherein the dwell time for the intermediate agitation profile is selected such that the successive strokes occur at a rate of between 75% and 133% of the time period of the first mode natural frequency.

8. The method of claim 6, wherein the dwell time for the intermediate agitation profile is selected such that the successive strokes occur at a rate of between 38% and 67% of the time period of the first mode natural frequency.

9. The method of claim 2, wherein the stroke direction pattern for the intermediate agitation profile comprises a plurality of successive strokes each in an opposite direction of the preceding stroke.

10. The method of claim 1, wherein the first agitation profile is used during the step of agitating articles within the tub for the second period.

11. The method of claim 1, wherein a second agitation profile is used during the step of agitating articles within the tub for the second period, the second agitation profile different from the first agitation profile and intermediate agitation profile.

12. The method of claim 1, wherein, during the step of measuring movement, agitating of the articles is actively ceased upon determination that the measured movement is less than the out-of-balance movement threshold.

13. A washing machine appliance, comprising:
  a tub;
  a basket rotatably mounted within the tub, the basket defining a wash chamber for receipt of articles for washing;
  a valve;
  a nozzle configured for flowing liquid from the valve into the tub;
  an agitation element;
  a measurement device;
  a motor in mechanical communication with the basket, the motor configured for selectively rotating the basket within the tub and further configured for selectively rotating the agitation element; and
  a controller in operative communication with the valve, the motor and the measurement device, the controller configured for:
    flowing a volume of liquid into the tub;
    agitating articles within the tub for a first period and using a first agitation profile, the tub containing the volume of liquid;
    measuring movement of the tub during agitation of the articles within the tub, wherein the step of measuring movement occurs after agitating articles within the tub for the first period and for an intermediate measurement period using an intermediate agitation profile, and wherein the intermediate agitation profile is different from the first agitation profile;
    agitating articles within the tub for a second period when the final measured movement is greater than an out-of-balance movement threshold;
    draining liquid from the tub when the final measured movement is less than the out-of-balance movement threshold; and
    spinning the basket after draining liquid from the tub, wherein agitating articles within the tub comprises redistributing the articles during a tumbling cycle within the tub through a repeated starting-stopping pattern of agitation strokes according to a corresponding agitation profile prior to the draining liquid from the tub.

14. The washing machine appliance of claim 13, wherein the first agitation profile and the intermediate agitation profile are each defined by an acceleration rate, an acceleration duration, stroke duration, a dwell time between strokes, and a stroke direction pattern.

15. The washing machine appliance of claim 14, wherein a maximum acceleration rate for the intermediate agitation profile is greater than a maximum acceleration rate for the first agitation profile.

16. The washing machine appliance of claim 14, wherein the stroke duration for the intermediate agitation profile is between one-quarter and one-third of a natural frequency of the tub relative to a cabinet of the washing machine appliance.

17. The washing machine appliance of claim 14, wherein a total stroke distance for the intermediate agitation profile is between 60 degrees and 150 degrees.

18. The washing machine appliance of claim 14, the stroke direction pattern for the intermediate agitation profile comprises a plurality of successive strokes in a single direction with no intervening strokes in an opposite direction.

19. The washing machine appliance of claim 13, wherein the first agitation profile is used during the step of agitating articles within the tub for the second period.

20. The washing machine appliance of claim 13, wherein a second agitation profile is used during the step of agitating articles within the tub for the second period, the second agitation profile different from the first agitation profile and intermediate agitation profile.

* * * * *